United States Patent [19]
Sri-Jayantha et al.

[11] Patent Number: 5,761,006
[45] Date of Patent: Jun. 2, 1998

[54] DIRECT ACCESS STORAGE DEVICE HAVING COMPOUND ACTUATOR BEARING SYSTEM

[75] Inventors: Muthuthamby Sri-Jayantha, Ossining; Arun Sharma, New Rochelle; Suresh Kumar, Croton-on-Hudson; Vijayeshwar Khanna, Ossining, all of N.Y.

[73] Assignee: International Business Machines Corporation, Armonk, N.Y.

[21] Appl. No.: 764,772

[22] Filed: Dec. 12, 1996

Related U.S. Application Data

[63] Continuation of Ser. No. 562,677, Nov. 27, 1995, abandoned, which is a continuation of Ser. No. 198,923, Feb. 18, 1994, abandoned.

[51] Int. Cl.⁶ .................................................. G11B 5/55
[52] U.S. Cl. ........................................................ 360/106
[58] Field of Search .................................. 360/104–106; 384/12, 25, 54, 58, 220, 535, 536

[56] References Cited

U.S. PATENT DOCUMENTS

| | | | |
|---|---|---|---|
| 3,097,895 | 7/1963 | Matt | 384/535 |
| 3,467,451 | 9/1969 | Marley | 384/535 |
| 3,743,870 | 7/1973 | Hunt | 310/13 |
| 4,394,091 | 7/1983 | Klomp | 384/101 |
| 4,555,189 | 11/1985 | Donkin | 384/493 |
| 4,682,255 | 7/1987 | Sfeger et al. | 360/106 |
| 4,745,504 | 5/1988 | Foote | 360/106 |
| 4,754,353 | 6/1988 | Levy | 360/106 |
| 4,764,829 | 8/1988 | Makino | 360/106 |
| 4,772,139 | 9/1988 | Bretton | 384/535 |
| 4,835,644 | 5/1989 | Schulze | 360/106 |
| 4,845,579 | 7/1989 | Wilkinson, Jr. | 360/106 |
| 4,872,767 | 10/1989 | Knapp | 384/535 |
| 4,893,206 | 1/1990 | Shtipelman et al. | 360/106 |
| 4,896,239 | 1/1990 | Ghose | 360/106 |
| 4,898,481 | 2/1990 | Hamblin | 384/535 |
| 4,900,165 | 2/1990 | Kun et al. | 384/536 |
| 4,901,014 | 2/1990 | Riegger et al. | 384/535 |
| 4,979,063 | 12/1990 | Ghose et al. | 360/106 |
| 5,088,840 | 2/1992 | Radtke | 384/535 |
| 5,099,374 | 3/1992 | Ohkita et al. | 360/106 |
| 5,112,147 | 5/1992 | Imamura et al. | 384/605 |
| 5,130,873 | 7/1992 | Yumura et al. | 360/106 |
| 5,161,077 | 11/1992 | Jabbari | 360/106 |
| 5,432,663 | 7/1995 | Ichihara | 360/106 |
| 5,486,965 | 1/1996 | Yoshida et al. | 360/106 |

FOREIGN PATENT DOCUMENTS

| | | |
|---|---|---|
| A 0 353 455 | 2/1990 | European Pat. Off. . |
| A 0 396 393 | 11/1990 | European Pat. Off. . |
| 0522717 | 1/1993 | European Pat. Off. . |
| 0407166 | 2/1910 | France . |
| 2810121 | 9/1979 | Germany . |
| 0203869 | 9/1991 | Japan . |

OTHER PUBLICATIONS

K. Mori et al., "A Dual-Stage Magnetic Disk Drive Actuator Using a Piezoelectric Device for a High Track Density" IEEE Transactions on Magnetics, vol. 27, No. 6, Nov. 1991 pp. 5298–5300.

*Primary Examiner*—Jefferson Evans
*Attorney, Agent, or Firm*—David Aker; Ronald L. Drumheller

[57] ABSTRACT

In a direct access storage device having a head for interaction with a storage medium and a moving actuator on which the head is mounted, the improvement comprises a compound bearing system for the actuator, the bearing system including a first bearing of low friction for small movements of the actuator; and a second bearing of higher friction for coarse movements of the actuator. The storage medium is preferably a rotating magnetic disk having a series of concentric circular tracks. A single servo system drives the actuator so that the head follows a selected track with motion of the first bearing, and movement of the head to a new track causes motion of the second bearing. Preferably the first bearing is a flex bearing and the second bearing is a ball bearing.

12 Claims, 5 Drawing Sheets

DIRECT ACCESS STORAGE DEVICE HAVING COMPOUND ACTUATOR BEARING SYSTEM

This is a continuation of application Ser. No. 08/562,677, filed Nov. 27, 1995, now abandoned, which is a continuation of application Ser. No. 08/198,923 filed Feb. 18, 1994, now abandoned.

FIELD OF THE INVENTION

This invention relates to direct access storage devices (DASD's). More particularly, it relates to DASD's wherein a head is moved with respect to a data storage medium. More specifically, it relates to bearing systems for an actuator on which the head is mounted.

BACKGROUND ART

In rigid magnetic disk files, high recording density, high access speed, and small size are required. Areal density, which is the product of linear density and track density, has been increasing by more than a factor of ten times every ten years. The linear density or BPI (bits per inch) is determined by the magnetic characteristics of a disk and a head, and head-disk spacing. Typical products have a linear density of about 80 kBPI. The length of each bit is less than 1 um.

However, the present practical track density or TPI (tracks per inch) is about 6 kTPI, and the track pitch is about 14 um. Thus, it is important to improve the track density to achieve high recording density. One limitation on track density results from the nature of the bearing on which the actuator that carries the head pivots. Conventional bearings, such as ball bearings, have fairly large coefficients of friction which must be overcome in order for the actuator to move with respect to the magnetic recording medium. Such frictional components are not necessarily reproducible for every motion of the actuator and tend to cause disturbance and lack of predictability with respect to the minute motions that are often required in order to follow a track. Such friction also results in unnecessary vibration because overshoot may occur and the servo system must compensate to follow a track.

Thus, to increase track density, it is necessary to have a more precise bearing system. However, attempts to increase the precision and decrease the friction of most bearing systems lead to the need for extremely precise machining of components which in turn results in very high costs. In the so-called low end market, for example, those disk drives used in personal computers, such higher costs can become a significant fraction of the cost of the DASD.

SUMMARY OF THE INVENTION

It is a principal object of the invention to provide a bearing system for the actuator of a direct access storage device which when used in a servo loop produces precise positioning. It is another object of the invention to provide a bearing which has very low friction for purposes of track following.

It is still another object of the invention to produce a bearing system for a DASD which is low in cost.

In accordance with the invention, in a direct access storage device having a head for interaction with a storage medium and a moving actuator on which the head is mounted, the improvement comprises a compound bearing system for the actuator, said bearing system including a first bearing of low friction for small movements of the actuator; and a second bearing of higher friction for coarse movements of the actuator. The storage medium is preferably a rotating magnetic disk having a series of concentric circular tracks. A servo system drives the actuator so that the head follows a selected track with motion of the first bearing, and movement of the head to a new track causes motion of the second bearing. Preferably the first bearing is a flex bearing and the second bearing is a ball bearing.

DESCRIPTION OF THE PREFERRED EMBODIMENT

Figure 1:
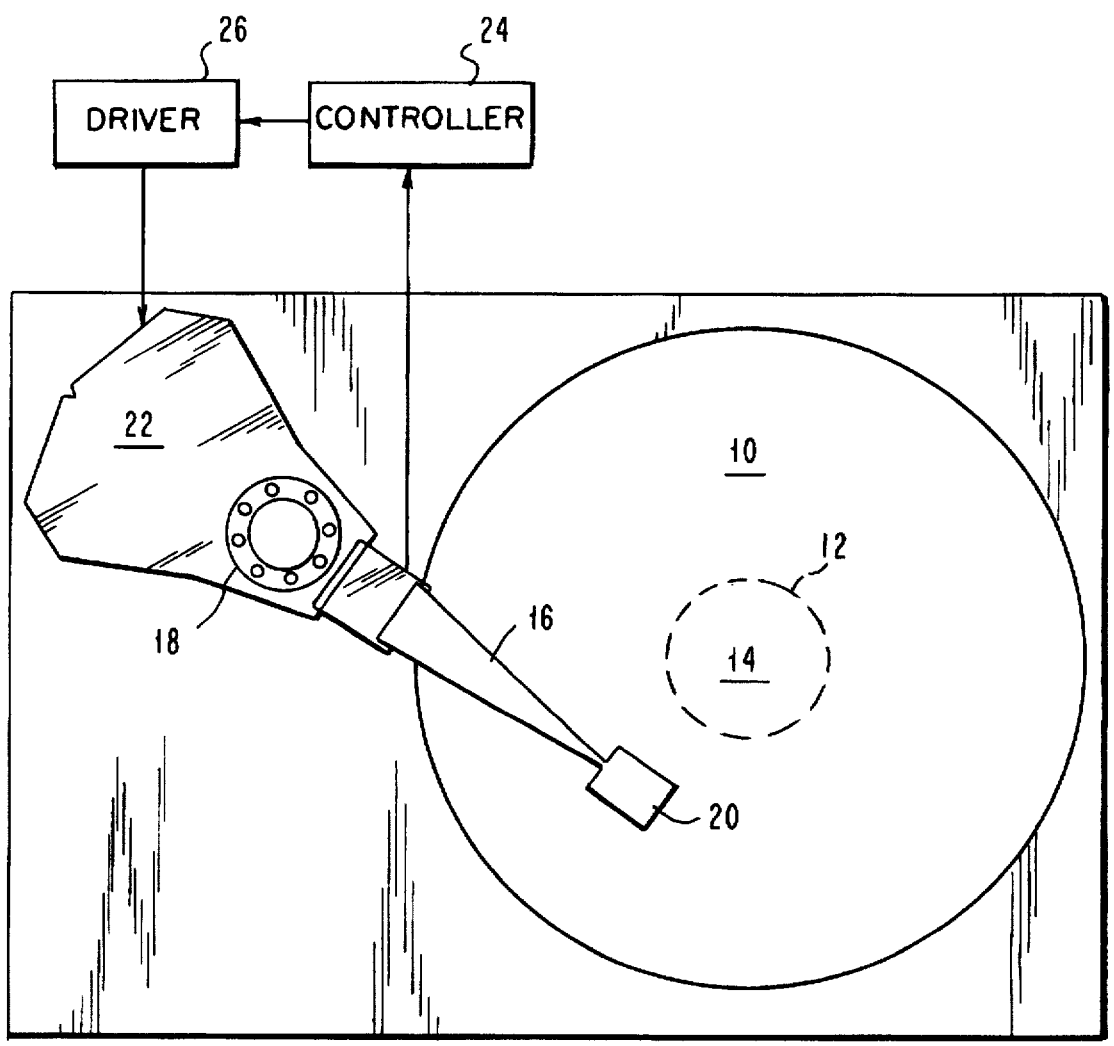
FIG. 1 is a schematic representation of a conventional rotary actuator based disk drive.

Referring to FIG. 1, a disk 10 is mounted on a spindle 12 which is rotated by a motor 14. An actuator arm 16 pivotally mounted on a bearing 18 has mounted at its end, a head 20 which magnetically interacts with the disk 10 for purposes of storing and retrieving information thereon. The radial position of head 20 with respect to disk 10 is controlled by a voice coil motor 22 which causes actuator 16 to pivot about bearing 18. As is well known in the art, some of the information stored on disk 10 may be position information which, when acquired by head 20 is useful in identifying the position of head 20 with respect to disk 10. More specifically, the position information which is picked up by head 20 from disk 10 is transmitted to a controller 24 which in turn supplies a signal to a driver 26. Driver 26 then supplies drive current to the coil of VCM 22. The controller has an input for receiving reference information which may include the track on disk 10 over which the head is to be position. The information received from head 20 is compared to that information in controller 24 and the output of controller 24 supplied to driver 26 is changed so that driver 26 supplies an appropriate output to VCM 22 to position the head as required.

In accessing a new track, as described above, there is generally a relatively large radial motion of actuator 16 with respect to disk 10. This is the so-called track-seek mode. Once the head has substantially reached the desired target track the controller switches into a so-called track following mode in which smaller displacements are required.

Figure 2:
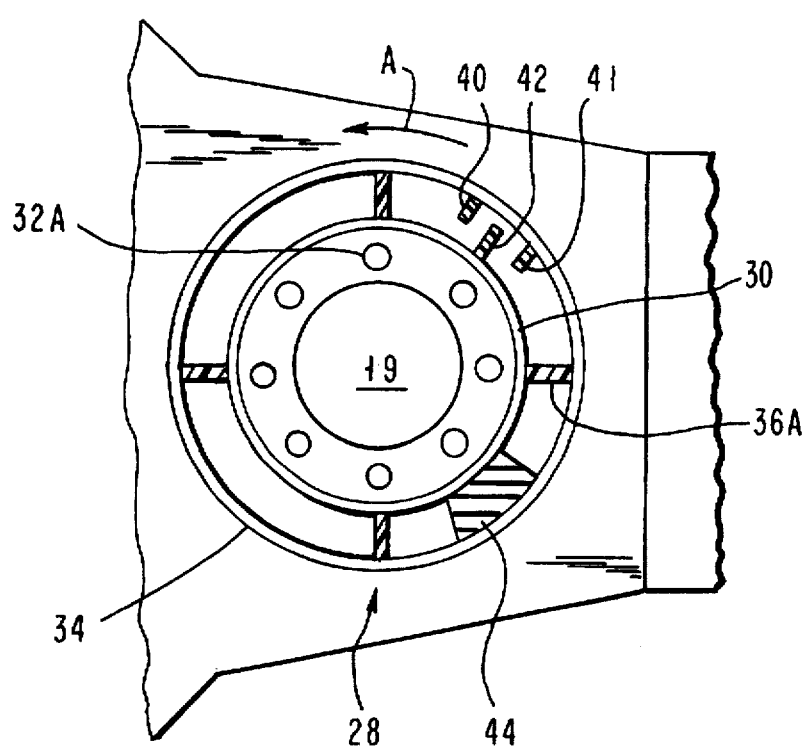
FIG. 2 is an enlarged somewhat schematic plan view of a first embodiment of an actuator bearing in accordance with the invention.
Figure 3:
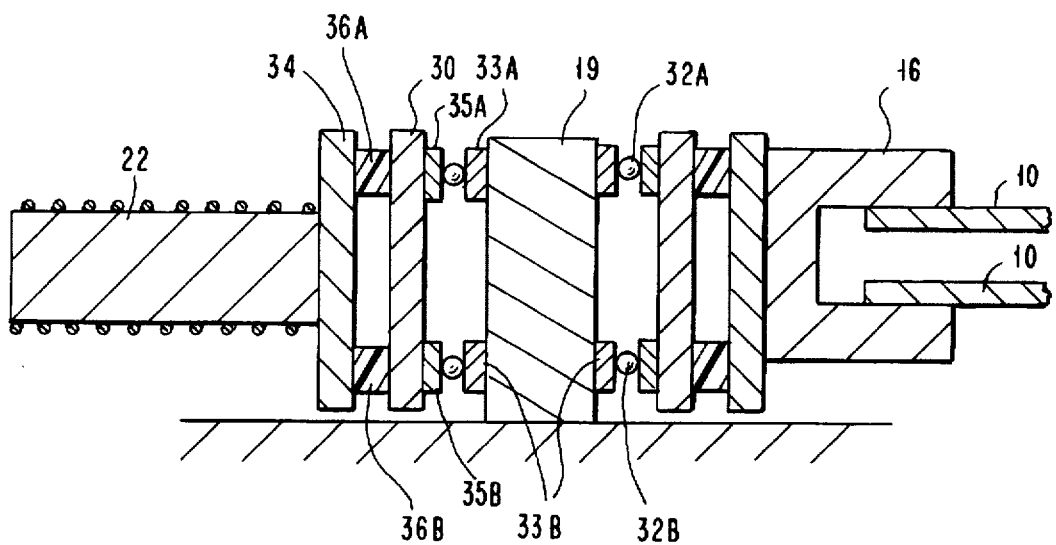
FIG. 3 is a somewhat schematic cross-sectional view of the embodiment of FIG. 2.

FIG. 2 and FIG. 3 illustrate a bearing 28 made in accordance with the present invention. Ring 30 serves as an outer bearing housing for two ball bearing assemblies (including balls 32A in an upper ball bearing assembly and balls 32B in a lower ball bearing assembly), inner bearing rings 33A, 33B affixed to shaft 19 and outer bearing ring 35A, 35B affixed to ring 30, thus permitting rotational movement about shaft 19. Ring 30, while serving as the outer ring for the ball bearing assembly, also serves as the inner ring of a flex-bearing assembly including an outer ring 34 and a plurality of flex members 36A,36B. It is important that flex-members 36A,36B be configured to allow flexure only in the circumferential direction represented by arrow A (FIG. 2). The stiffness should be very high in other directions. Thus, flex members 36A,36B are rigid in directions perpendicular to the direction which permits circumferential flexure.

For small displacements, such as those commonly occurring in the track following mode, slight deflection or deformation of flexures 36A,36B occur, in the order of some fraction of a track width, and there is no motion of ring 30 with respect to shaft 19. The inherent friction of the ball bearing assembly is not overcome by the forces produced by this limited deflection or flexure of the flex members 36A, 36B. However, if controller 24 is commanded to move the head to a new track and a relatively large deflection of flex members 36A, 36B occurs, the forces are sufficient to overcome the friction of the bearing assembly and ring 30 will rotate with respect to shaft 19 thus providing for large scale movements. In order to increase the life of the flex members 36A, 36B of the flexure bearing assembly, outer ring 34 may be fitted with two protrusions 40 and 41 which extend radially inward toward shaft 19 for a distance insufficient to engage inner ring 30 of the flex-bearing assembly. A member 42 extends outward from inner ring 30 toward outer ring 34 by a distance insufficient to contact outer ring 34 but sufficient to engage members 40 and 41. Member 42 is positioned between members 40 and 41. The combination of members 40, 41 and 42 act as a motion limiter which limits the total amount of possible flexure of flex members 36A, 36B before further rotation requires that the ball bearing assembly come into play and inner ring 30 must rotate with respect to shaft 19. Thus, even if there are unexpected increases in the friction associated with the ball bearing assembly, there will not be excessive deflections of the flex members and their life will not be unduly limited due to fatigue failure.

After relatively large displacement to a new track has occurred it is possible that there may be some transient oscillatory motion of the actuator with respect to shaft 19 which causes flex members 36A, 36B to flex in an oscillatory motion to follow actuator 16. Thus, if it is found necessary a dampening material 44 such as a commercially available visco-elastic polymer bonded on one side to outer ring 34 and on the other side to inner ring 30 may be included in the assembly. This material will quickly dampen out such vibrations thus permitting quick settle-out on the target track and also preventing degradation of the life of flex members 36A, 36B.

It will be recognized that bearings other than those specifically described above may be used. For example, one of the bearings may be a simple journal bearing as described below with reference to FIG. 4 for coarse motion. For fine motion an air bearing design may be used as described below with respect to a linear actuator. What is important is that the bearing permitting coarse motion be of a relatively low cost design with a considerable amount of friction while the bearing permitting fine motion must be of low friction. However, the low friction bearing may be a flex bearing, as described above, which provides some bias toward a center position or, if it is an air bearing, provides no bias at all. However, the friction in the bearing used for coarse positioning should not be excessive and further, it is preferable that in order to conserve power in the servo, there be no bias forces associated with the coarse bearing.

Figure 4:
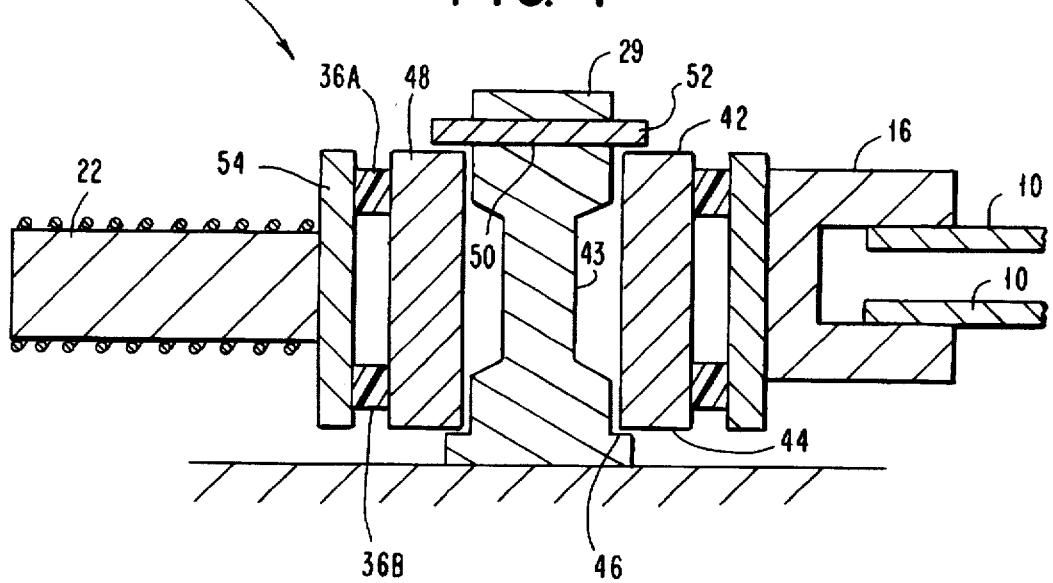
FIG. 4 is a somewhat schematic cross-sectional view of a second embodiment of a bearing in accordance with the invention and associated components.

It should also be noted, that while the coarse bearing is shown as the inner bearing and the fine position bearing is shown as the outer bearing, there is no reason why the relative positions cannot be reversed so that the bearing used for coarse positioning is the outer bearing and the bearing used for fine positioning is the inner bearing. In these embodiments in which rotary actuators are used, the bearings are concentrically located. Referring to FIG. 4 a bearing system 40 using a journal bearing and a flex bearing is illustrated. A bushing 42 is mounted for rotation about fixed shaft 29. Shaft 29 differs from shaft 28 in that it has a reduced diameter portion 43. Provision of reduced diameter portion 43 permits reduced precision of a portion of the length of shaft 29 and bushing 42.

A portion of the flat annular surface 44 of bushing 42 slidably engages a shoulder 46 formed on shaft 29. A portion of the top annular surface 48 of bushing 42 slidably engages a bottom surface 50 of an annular retaining ring 52 which is fixedly mounted on shaft 29. Thus, bushing 42 is retained between shoulder 46 of shaft 29 and lower surface 50 of retaining ring 52.

It will be understood that the clearance between the inner surface of bushing 46 and the outer surfaces of shaft 29 which come in contact with these inner surfaces is critical. The fit must be close and free of excessive motion but cannot be so tight as to introduce excessive friction into the journal bearing that is created.

In a manner analogous to that described with respect to FIG. 2 and FIG. 3 a plurality of flex members 36A and 36B connect bushing 42 to an outer ring 54 that serves as a housing for the flex bearing component of the bearing system 40. The operation of bearing system 40 of FIG. 4 is similar to that of the operation of the bearing 28 of FIG. 2 and FIG. 3 in that fine motion is achieved by deformation or flexure of the flex members while coarse motions are accommodated by the journal bearing, resulting in the rotation of bushing 42 with respect to shaft 29.

Figure 5:
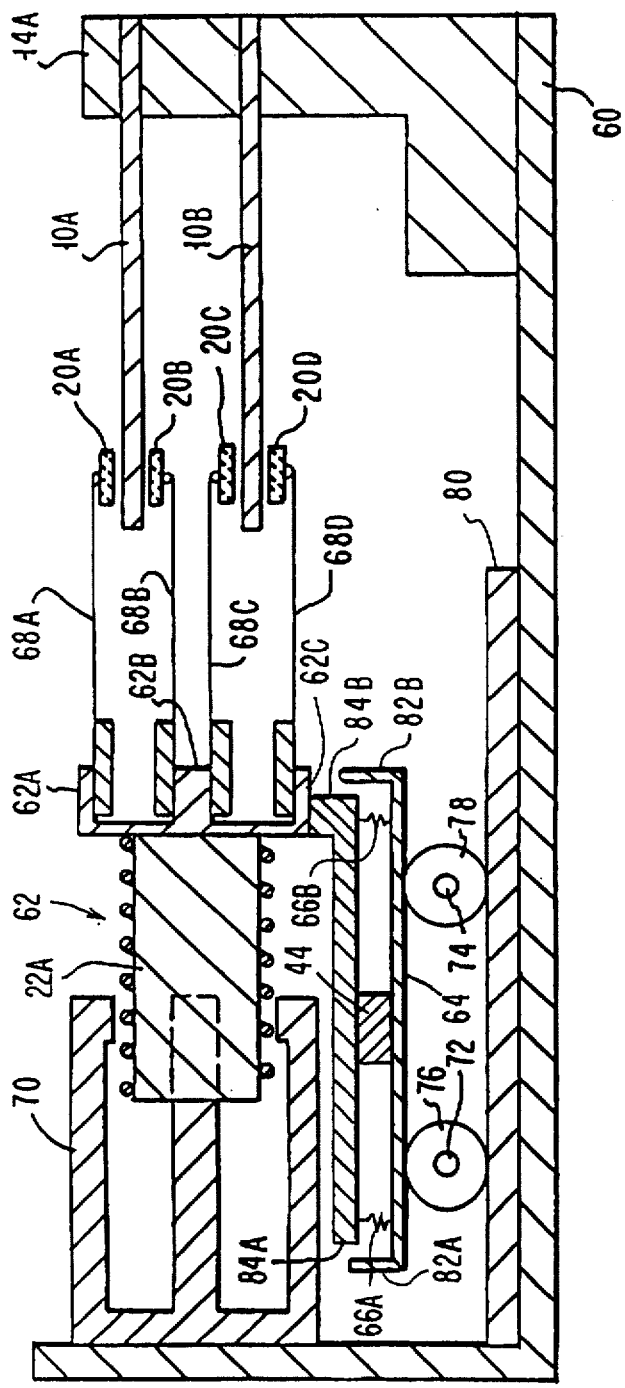
FIG. 5 is a schematic cross-sectional view of the application of the invention to a first embodiment of a linear actuator system.

Referring to FIG. 5, a direct access storage device having a linear actuator is illustrated. Two disks 10A and 10B are mounted to a spindle 14A which rotates with respect to a base 60. An actuator arm 62 is mounted to a carriage 64 by two flex members 66A and 66B as more fully explained below. Arm 62 has upper extension 62A, middle extension 62B and a lower extension 62C. A head suspension assembly 68A is fixedly attached to upper extension 62B while head suspension assemblies 68B and 68C are fixedly attached to extension 62B. A head suspension assembly 68D is fixedly attached to lower extension 62C. Heads 20A, 20B, 20C, and 20D are mounted on head suspensions assemblies 68A, 68B, 68C and 68D respectively.

Arm 62 is driven radially with respect to the disks 10A and 10B by a voice coil motor including coil 22A and magnet 70.

Carriage 64 has affixed thereto axles 72 and 74. Each axle has mounted thereto, with a ball bearing assembly, a wheel 76 and 78 respectively which rides along a rail 80. It will be understood that there generally are at least two rails and at least two wheels on each axel with one wheel of each axel on each rail. For simplicity only one rail is shown. Current in coil 22A causes arm 62 to move from left to right or right to left in FIG. 5 resulting in motion of the heads 20A, 20B, and 20C and 20D over their respective disks in the radial direction. In order to increase the life of flexure members 66A and 66B, carriage 64 has vertical extensions 82A and 82B which extend in a vertical direction sufficiently to be contacted by extension portions 84A and 84B respectively of arm 62 after a predetermined amount of motion of arm 62 with respect to carriage 64. This prevents excessive flexing of flexure members 66A and 66B and thereby increases their life. A dampening material 44 similar to that used in FIG. 2 may also be included for the reasons set for above.

Thus, in a manner exactly analogous to that described above for the case of a rotary actuator system, the invention can be implemented in a linear actuator system.

Figure 6:
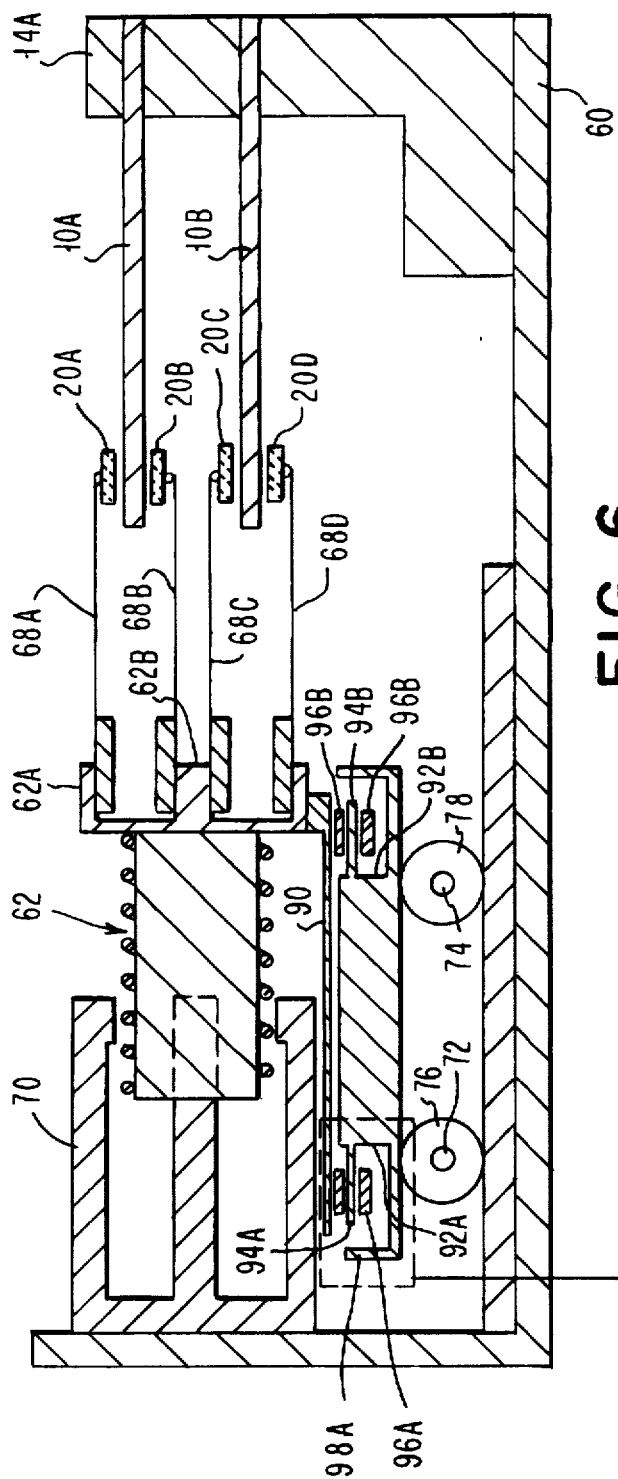
FIG. 6 is a schematic cross-sectional view of the application of the invention to a second embodiment of a linear actuator system.
Figure 7:
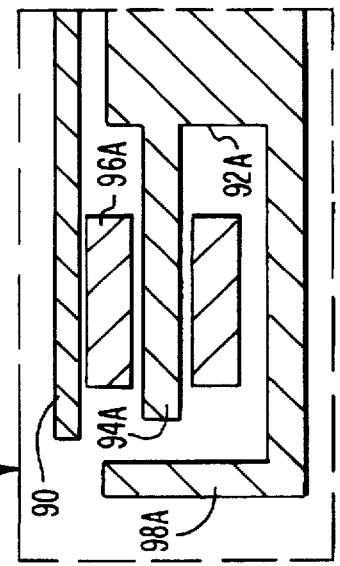
FIG. 7 is an enlarged view of a portion of the embodiment illustrated in FIG. 6.

FIG. 6 (and the enlarged portion of FIG. 6 illustrated in FIG. 7) is similar to FIG. 5 except that an air bearing has been substituted for the flexure bearing of FIG. 5. More specifically, arm 62 is mounted on a horizontal member 90. Further, carraige 64A includes two vertical walls 92A and 92B which have extending therefrom rods 94A and 94B respectively. These rods are part of an air bearing system including bearing sleeves 96A and 96B respectively. Sleeves 96A and 96B each have a multitude of small openings through which air from an air source (not shown) is forced. As a result, a frictionless and bias free bearing system between arm 62A and carriage 64A is created. Carriage 64A has extending therefrom motion limiter stops 98A and 98B respectively. Upon sufficient motion of arm 62A, the left end of sleeve 96A contacts extension 98A (motion to the left in FIG. 6) or the right end of sleeve 96B contacts extension 98B (motion to the right in FIG. 6).

Thus, in the track seek mode there is coarse motion of arm 62A which causes carriage 64A to move on wheel 76 and 78 along track 80. However, when in the track following mode, carriage 64 is stationery and arm 62A moves with respect to carriage 64A on the air bearings.

It will be understood that while two air bearings have been illustrated, in practice at least three should be used and it is preferred that four be used, as is the case with respect to the wheel and rail system described above.

It will be understood by one skilled in the art that the flex members may be configured in any one of a number of shapes and the precise number may be varied to suit particular design constraints. The exact configuration and number are not believed to be critical to the invention.

The present invention while illustrated with respect to embodiments having a fixed shaft may also be applied to designs using a rotating shaft with a fixed outer housing. In such designs the bearing is between the fixed housing and the moving shaft. The principles of operation are identical to those described above.

A further variation with respect to the present invention is the use of relatively low friction bearing in place of a relatively high friction component. A controlled friction generating component is then added to the low friction component to generate a pre-determined and controllable amount of friction. The friction generating component may be of the passive type such as a preloaded brake shoe configuration loaded with a fixed amount of preload. Alternatively, friction may be generated in a more active fashion by a brake shoe type device which is activated by a force generating device such as a solenoid. The use of such devices permits tailoring the operation of the servo system to optimize performance for a particular design. This is especially true in the case of the active type of force generating device, where the performance may be changed during operation. One skilled in the art will recognize that the addition of such friction generating devices will add to cost and may not be appropriate for the very low end market. However, for high performance or medium cost DASD's the additional cost may not be objectionable.

While the invention has been described in connection with specific embodiments, it will be understood that those with skill in the art may be able to develop variations of the disclosed embodiments without departing from the spirit of the invention or the scope of the following claims:

We claim:

1. In a direct access storage device having a head for interaction with a storage medium, a moving actuator on which the head is mounted, an electromechanical drive for moving the actuator and a position servo system for receiving head position information and controlling the electromechanical drive to position the head to a desired position, the improvement comprising:

a compound bearing system for allowing movement of the actuator substantially only in a rotary direction of movement, said bearing system including:

a first bearing of low friction for allowing small changes of the actuator position to be made by the electromechanical drive in said rotary direction of movement through movement of said first bearing, said first bearing comprising a flex bearing formed by an outer ring, an inner ring within the outer ring and a plurality of flex members disposed around the inner ring and connecting the inner ring to the outer ring and allowing rotary deflection of the outer ring with respect to the inner ring; and a second bearing of higher friction for allowing coarse changes of the actuator position to be made by said electromechanical drive in said rotary direction of movement through movement of said second bearing, friction of said second bearing being sufficiently greater than friction of said first bearing that said first bearing moves during small changes of the actuator position in said rotary direction of movement without any movement of said second bearing and said second bearing moves during coarse changes of the actuator position in said rotary direction of movement, whereby large changes of the actuator position are made by the electromechanical drive in said rotary direction of movement under said higher friction of said second bearing and small changes of the actuator position are made by the electromechanical drive in said rotary direction of movement under said low friction of said first bearing, thereby improving the accuracy with which said electromechanical drive can position the actuator.

2. The direct access storage device of claim 1 further comprising:

a servo positioning system for receiving position data from said storage medium and for providing an output to position said actuator.

3. The direct access storage device of claim 2 having a single actuator.

4. The direct access storage device of claim 2 wherein the storage medium is a rotating magnetic disk having a series of concentric circular tracks and said servo system drives said actuator so that said head follows a selected track with motion of said first bearing, and movement of the head to a new track causes motion of said second bearing.

5. The direct access storage device of claim 1 wherein said second bearing is a ball bearing.

6. The direct access storage device of claim 1 wherein said second bearing is a journal bearing.

7. The direct access storage device of claim 1 wherein said storage medium is a rotating disk and said actuator is a rotary actuator which causes said head to move radially with respect to said disk.

8. The direct access storage device of claim 1 further comprising:

motion limiting means for limiting the motion of said first bearing, to thus cause motion of said second bearing to occur when a limit of motion established by said motion limiting means is exceeded.

9. The direct access storage device of claim 1 further comprising a vibration damping means for damping vibratory motion of the actuator.

10. The direct access storage device of claim 1 wherein said storage medium includes a plurality of data tracks and said bearings are designed to permit motion in a direction which permits the head to move over said storage medium to interact with any selected track but to constrain motion in directions perpendicular to said direction.

11. The direct access storage device of claim 1 further comprising means for introducing additional friction against motion of said second bearing.

12. The direct access storage device of claim 1 wherein the electromechanical drive only indirectly applies force to the actuator via the compound bearing system and applies no direct force to the actuator.

* * * * *